UNITED STATES PATENT OFFICE.

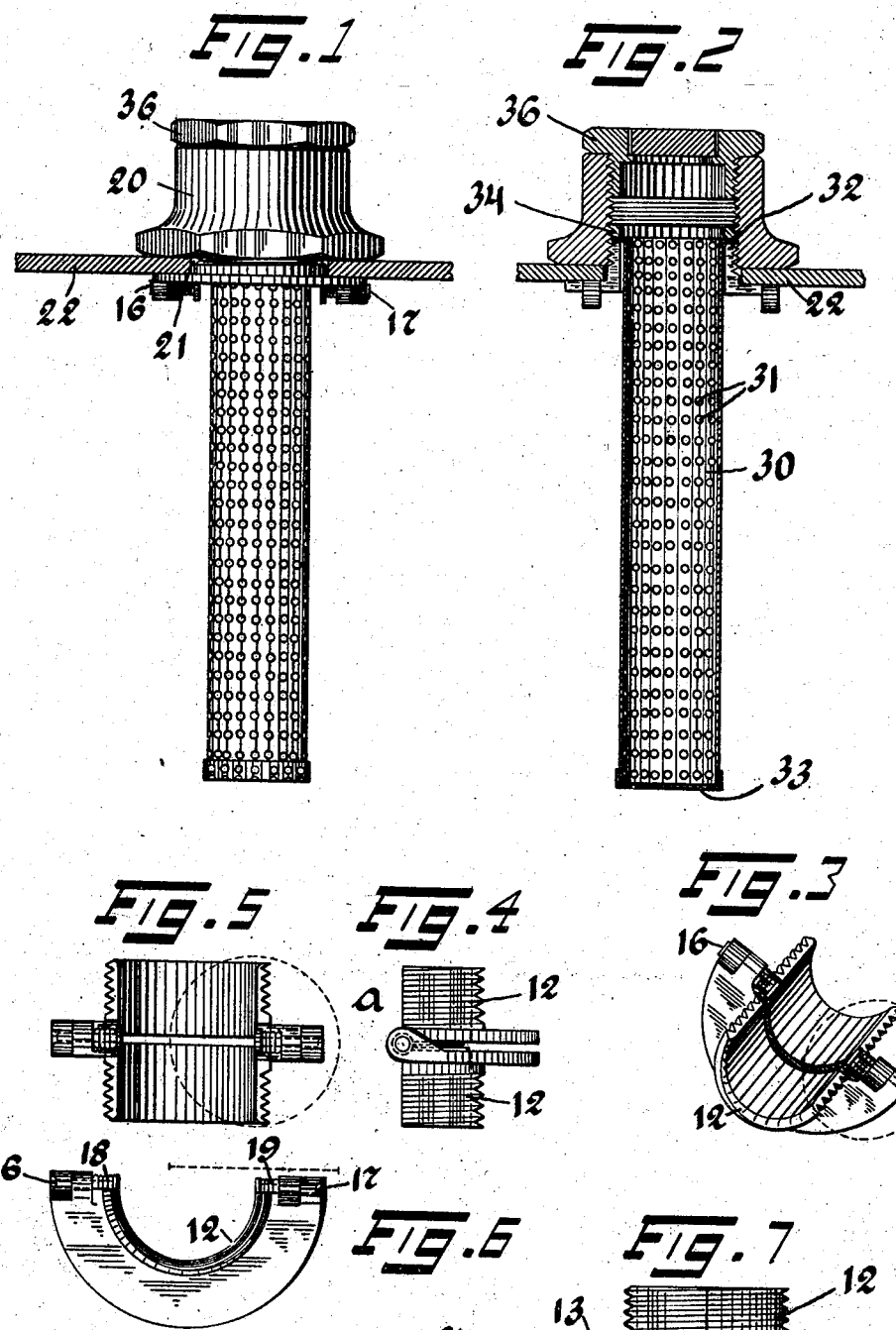

WILLIAM H. McNUTT, OF NEW YORK, N. Y., ASSIGNOR TO THE NON-EXPLOSIVE SAFETY NAPHTHA CONTAINER COMPANY, OF NEW YORK, N. Y., A CORPORATION OF SOUTH DAKOTA.

CLAMPING DEVICE FOR RECEPTACLES.

No. 858,899.

Specification of Letters Patent.

Patented July 2, 1907.

Application filed February 23, 1907. Serial No. 358,837.

*To all whom it may concern:*

Be it known that I, WILLIAM H. McNUTT, a citizen of the United States, residing in New York city, in the county of New York and State of New York, have invented certain new and useful Improvements in Clamping Devices for Receptacles, of which the following is a specification.

This invention relates to a form of clamping device arranged to be secured at the margins of an opening in a plate, where access is to be had at one side of the plate only; such for instance, as an aperture formed in a closed vessel, like a can.

The purpose of the invention is to provide such a device whereby one part of a clamping device can be inserted through an opening in a plate, and can then be caused to engage the margins of such opening from the inner side, in conjunction with a second member that co-operates with the other member and engages the margins of the opening on the outer side, the members being organized to lock together, and thereby form a means for attachment of certain devices to the vessel or device of which the plate forms a part.

The invention is especially designed for use with cans or vessels for containing inflammable or explosive fluids such as gasolene, kerosene or the like, whereby a safety device can be secured to the vessel at such point, especially for filling purposes.

In the accompanying drawings showing an embodiment of the present invention, Figure 1 is a side elevation of the device in position on a plate. Fig. 2 shows the same in longitudinal section. Fig. 3 is a perspective view of the principal clamping member in its flexed or opened position for insertion through an aperture in a plate, the broken lines indicating the aperture. Fig. 4 represents the same in side elevation, and Fig. 5 is a similar side elevation from a different point of view, the circle indicating the aperture through which the member can be inserted. Fig. 6 is a similar view in plan, the broken line indicating the diameter of the aperture through which the member can be inserted. Fig. 7 represents the same member in side elevation in its normal annular position; and Fig. 8 is a perspective view of the clamping ring for locking the perforated tube to the clamping member.

The principal member of the clamping device denoted generally by *a* is shown as composed of a sleeve portion 12 provided with a flange portion 13 at one end. This member *a* is bisected axially forming two complemental portions that are secured together to swing on an axis perpendicular to the axis of the member and which axis preferably passes through the flange portion 13; whereby the two parts of the device can be swung from the position of Fig. 7 through 90 degrees to the position indicated in Figs. 3 to 6.

In the construction shown, the two complemental portions 14 and 15 of the member are pivoted together by pins 16 and 17 passing through suitable ears formed on the flange members in alinement. Springs 18 and 19 may be used at the pivot portions to yieldably retain the device in the annular position as shown in Fig. 7. The sleeve member 12 is threaded to engage a clamping member, and is shown as externally threaded, to engage the internal threads of a clamping nut 20.

In order to secure the two members to be secured at the margins of an opening as for instance an aperture 21 in a plate 22, that is of sufficient size to permit insertion of the sleeve portion 12 through the aperture, to cause the flange portion 13 to engage the margin of the aperture; the clamping member *a* is swung on its pivot to the position indicated in Figs. 3 to 6, in which it will assume a substantially crescent form. The member can now be passed through the opening as in Figs. 3 and 5, the aggregate length and height of the two alining sleeve portions in this position being less than the dimension of the opening, it can be passed into the opening therethrough by giving it a curved movement, that will tend to keep the diameter of the opening in substantial alinement with the diameter of the clamping member. If desired, a wire or string may be attached to the member so that when passed into the opening, it will not be dropped. As soon as the member passes through the opening in the plate, upon being released the springs will return it to its normal annular position, and it can now be brought to the opening by the string and grasped by the fingers to draw the sleeve portion through the opening causing the flange to engage the margin of the opening in the plate from the inner side, as indicated in Fig. 2. While held in this position, the nut member 20 can be screwed onto the sleeve, until the margins of the plate 22 can be clamped between the nut and the flange of the two part member, which can be securely locked in this position. This means now clamped in the aperture in the plate can be used for any desired purpose. In the device illustrated, a safety tube is shown as secured in the clamping device. A tube 30 having minute openings therein, preferably provided with small perforations 31, has one end flanged at 32 to engage the upper end of the clamping member *a* after the tube has been inserted through the bore in the member as shown in Figs. 1 and 2. The lower end of the tube is closed by a cap 33, that may also be perforated if desired. A ring nut 34 screws in the bore of the nut 20 and is screwed down on top of the flange 32 of the tube. By this means, the access to the vessel of which the plate 22 may form the top is closed except through the perforations of the tube, and this will act as a safety device preventing flame passing into the vessel to cause an explosion. If desired a suitable plug member as 36 may screw into the top of the nut member 20 to close the opening therein.

With the use of this device, a filler tube, or a closing cap, or other device can be attached to a comparatively thin plate forming the part of a closed vessel, or part of a member where access is to be had from one side only. It is only necessary to cut the hole or aperture in the plate, and no threaded portion is needed or any special clamping means such as solder or rivets. It is only necessary to bend up the pivoted clamping member, insert it through the opening, and then bring its sleeve back through the opening and secure the lock nut onto the sleeve from the outside when the device is securely assembled in position. The filler tube is then inserted and its ring nut locks it securely in position.

Having thus described my invention, I claim:

1. In a clamping device, an annular member composed of a sleeve part and a flange part, the member comprising two portions organized to swing on a diametral axis into a substantially crescent form, whereby when so swung the device can be inserted through an aperture in a plate of less maximum dimension than the diameter of the flange portion of the member when in normal annular position, the sleeve being threaded, a nut member arranged to engage the threaded sleeve to clamp the margins of an apertured member between it and the flange of the annular member, a tubular member containing minute openings of a size to be inserted into the annular member, and means for securing one end portion of the tube in the nut member.

2. In a clamping device, an annular member composed of a sleeve part and a flange part, the member comprising two portions organized to swing on a diametral axis into a substantially crescent form, whereby when so swung the device can be inserted through an aperture in a plate of less maximum dimension than the diameter of the flange portion of the member when in normal annular position, the sleeve being threaded, a nut member arranged to engage the threaded sleeve to clamp the margins of an apertured member between it and the flange of the annular member, a tubular member having one end closed and provided with minute openings, the tube having its other end flanged and being of a size to be inserted in the annular member to have its flange engage the end thereof, and a second nut member arranged to screw into the said nut member of the clamping device on top of the flange of the tube and thereby lock the tube in position.

3. In a clamping device, an annular member composed of a sleeve part and a flange part, the member comprising two portions organized to swing on a diametral axis into a substantially crescent form, whereby when so swung the device can be inserted through an aperture in a plate of less maximum dimension than the diameter of the flange portion of the member when in normal annular position, the sleeve being threaded, a nut member arranged to engage the threaded sleeve to clamp the margins of an apertured member between it and the flange of the annular member, a tubular member having one end closed and provided with minute openings, the tube having its other end flanged and being of a size to be inserted in the annular member to have its flange engage the end thereof, a second nut member arranged to screw into the said nut member of the clamping device on top of the flange of the tube and thereby lock the tube in position, and a cap member screwing into the said first nut member to close its bore.

4. In a clamping device, a clamping member composed of a sleeve having a flange portion at one end, said member being divided diametrically into two parts pivoted together at the flange portions whereby the parts can be swung to a substantially crescent form organized to pass through an opening in a plate of a size that will admit the sleeve of the member and will cause engagement of the flange at the margins of the plate opening, a spring on each side of the joint normally retaining the flange parts in alinement, the sleeve being threaded, and a nut member arranged to engage the threaded sleeve to clamp the margins of an apertured member between the nut and the flange of the annular member.

5. In a clamping device, an annular member composed of a sleeve part and a flange part, the member comprising two portions organized to swing on a diametral axis into a substantially crescent form, whereby when so swung the device can be inserted through an aperture in a plate of less maximum dimension than the diameter of the flange portion of the member when in normal annular position, a spring on each side of the joint, normally retaining the flange parts in alinement, the sleeve being threaded, a nut member arranged to engage the threaded sleeve to clamp the margins of an apertured member between it and the flange of the annular member, a tubular member containing minute openings of a size to be inserted into the annular member, and means for securing one end portion of the tube in the nut member.

6. In a clamping device, an annular member composed of a sleeve part and a flange part, the member comprising two portions organized to swing on a diametral axis into a substantially crescent form, whereby when so swung the device can be inserted through an aperture in a plate of less maximum dimension than the diameter of the flange portion of the member when in normal annular position, a spring on each side of the joint to normally retain the sleeve part in alinement, the sleeve being threaded, a nut member arranged to engage the threaded sleeve to clamp the margins of an apertured member between it and the flange of the annular member, a tubular member having one end closed and provided with minute openings, the tube having its other end flanged and being of a size to be inserted in the annular member to have its flange engage the end thereof, a ring nut arranged to screw into the said nut member of the clamping device on top of the flange of the tube and thereby lock the tube in position, and a cap member screwing into the said first nut member to close its bore.

WILLIAM H. McNETT.

Witnesses:
FRED. J. DOLE.
WILLIAM H. REID.